United States Patent
Bäckman et al.

(10) Patent No.: US 8,367,763 B2
(45) Date of Patent: Feb. 5, 2013

(54) POLYETHYLENE COMPOSITION FOR PRESSURE PIPES WITH ENHANCED FLEXIBILITY

(75) Inventors: Mats Bäckman, Göteborg (SE);
Lars-Erik Ahlstrand, Ucklum (SE);
Per-Ola Hagstrand, Stenungsund (SE);
Magnus Palmlöf, Västra Frölunda (SE)

(73) Assignee: Borealis Technology Oy, Porvoo (FI)

( * ) Notice: Subject to any disclaimer, the term of this patent is extended or adjusted under 35 U.S.C. 154(b) by 772 days.

(21) Appl. No.: 12/440,637

(22) PCT Filed: Sep. 28, 2007

(86) PCT No.: PCT/EP2007/008482
§ 371 (c)(1),
(2), (4) Date: Mar. 10, 2009

(87) PCT Pub. No.: WO2008/040504
PCT Pub. Date: Apr. 10, 2008

(65) Prior Publication Data
US 2010/0178443 A1   Jul. 15, 2010

(30) Foreign Application Priority Data
Oct. 4, 2006   (EP) .................................. 06020872

(51) Int. Cl.
*C08K 5/00* (2006.01)
*B29D 23/00* (2006.01)
(52) U.S. Cl. ...................................... 524/515; 428/36.9
(58) Field of Classification Search .................. 524/515
See application file for complete search history.

(56) References Cited

U.S. PATENT DOCUMENTS 6,878,784 B1 * 4/2005 Asumalahti et al. ............ 526/64
2002/0156214 A1   10/2002 Laurent
2003/0149162 A1 * 8/2003 Ahlstrand ..................... 524/495
2009/0062463 A1 * 3/2009 Backmann et al. ............. 525/52
2009/0252910 A1 * 10/2009 Baeckman et al. ......... 428/36.92

FOREIGN PATENT DOCUMENTS

| EP | 0 739 937 | 10/1996 |
|---|---|---|
| EP | 1 146 078 | 10/2001 |
| EP | 0 810 235 | 11/2004 |
| EP | 1 574 549 | 9/2005 |
| EP | 1 655 334 | 5/2006 |
| EP | 1 655 335 | 5/2006 |
| EP | 1 764 389 | 5/2008 |
| WO | WO 97/43323 A1 | 11/1997 |
| WO | WO 00/01765 | 1/2000 |
| WO | WO 00/22040 | 4/2000 |
| WO | WO 01/05852 A1 | 1/2001 |
| WO | WO 02/102891 | 12/2002 |
| WO | WO 2004/055068 | 7/2004 |
| WO | WO 2004/055069 | 7/2004 |

OTHER PUBLICATIONS

International Preliminary Report on Patentability for International application No. PCT/EP2007/008482.
International Search Report for International application No. PCT/EP2007/008482.
Written Opinion of the International Searching Authority for International application No. PCT/EP2007/008482.
Response to Written Opinion for International application No. PCT/EP2007/008482.

* cited by examiner

*Primary Examiner* — Hui Chin
(74) *Attorney, Agent, or Firm* — Fay Sharpe LLO

(57) ABSTRACT

The present invention relates to a polyethylene composition comprising a base resin which comprises (a) an ethylene homo- or copolymer fraction (A); and (b) an ethylene homo- or copolymer fraction (B), wherein (i) fraction (A) has a lower average molecular weight than fraction (B); (ii) the base resin has a density of 940 to 947 kg/m$^3$; (iii) the polyethylene composition has an MFR$_5$ of 0.1 to 0.5 g/10 min; and (iv) the polyethylene composition has an SHI$_{(2.7/210)}$ of 10 to 49. Furthermore, the present invention relates to an article, preferably a pipe comprising said composition and to the use of said composition for the production of an article, preferably a pipe.

18 Claims, No Drawings

POLYETHYLENE COMPOSITION FOR PRESSURE PIPES WITH ENHANCED FLEXIBILITY

The present invention relates to a polyethylene composition for pipes which comprises a polymeric base resin comprising two polyethylene fractions with different molecular weight. Furthermore, the present invention relates to an article, preferably a pipe, comprising said composition and to the use of said composition for the production of an article, preferably of a pipe.

Polyethylene compositions comprising two or more polyethylene fractions with different molecular weight are often referred to as bimodal or multimodal polyethylene compositions. Such polyethylene compositions are frequently used e.g. for the production of pipes due to their favourable physical and chemical properties as e.g. mechanical strength, corrosion resistance and long-term stability. When considering that the fluids, such as water or natural gas, transported in a pipe often are pressurized and have varying temperatures, usually within a range of 0° C. to 50° C., it is obvious that the polyethylene composition used for pipes must meet demanding requirements. On the other hand, to facilitate installation of the pipes e.g. into the ground, a high flexibility of the pipes is desired.

In particular, the polyethylene composition used for a pipe should have high mechanical strength, good long-term stability, notch/creep resistance and crack propagation resistance, and, at the same time high flexibility. However, at least some of these properties are contrary to each other so that it is difficult to provide a composition for pipes which excels in all of these properties simultaneously. For example, stiffness imparting mechanical strength to the pipe is known to improve with higher density but, in contrast, flexibility and notch/creep resistance is known to improve with reduced density.

Furthermore, as polymer pipes generally are manufactured by extrusion, or, to a smaller extent, by injection moulding, the polyethylene composition also must have good processability.

It is known that in order to comply with the contrary requirements for a pipe material, bimodal polyethylene compositions may be used. Such compositions are described e.g. in EP 0 739 937 and WO 02/102891. The bimodal polyethylene compositions described in these documents usually comprise two polyethylene fractions, wherein one of these two fractions has a lower molecular weight than the other fraction and is preferably a homopolymer, the other fraction with higher molecular weight preferably being an ethylene copolymer comprising one or more alpha-olefin comonomers.

One great disadvantage of such pipes when used for gas or cold water infrastructure is the lack of flexibility of the pipes. The pipes are rigid and strong. These mechanical properties are the result of the high demands regarding mechanical strength and long-term stability.

In laying known gas or cold water pipes, for example in open-trench laying or trenchless laying technologies like plough-in-place laying, often problems occur due to the stiffness of the pipes. It is often difficult to align and manoeuvre the pipes into the trenches. Still further, it is often a problem to straighten pipes which are stored or transported as coils. The same problem occurs if bends have to be passed which is particularly important for pipes of smaller and medium size. All these problems are of course even more relevant when the stiffness of the pipes increases due to lower temperature, for example in cold weather.

It is thus particularly desirable to provide a pipe with enhanced flexibility without loosing the mechanical strength and the long term stability.

Accordingly, it is the object of the present invention to provide a polyethylene composition for pipes having an improved combination of properties, in particular having enhanced flexibility and, simultaneously, high mechanical strength and good long-term stability.

The present invention is based on the surprising finding that the above mentioned object can be achieved by a polyethylene composition comprising at least two polymer fractions with different molecular weights, having carefully selected values of density and $MFR_5$ within small ranges and the polyethylene composition having a rather low SHI.

Accordingly, the present invention provides a polyethylene composition comprising a base resin which comprises
(a) an ethylene homo- or copolymer fraction (A); and
(b) an ethylene homo- or copolymer fraction (B),
wherein
(i) fraction (A) has a lower average molecular weight than fraction (B);
(ii) the base resin has a density of 940 to 947 kg/m³;
(iii) the polyethylene composition has an $MFR_5$ of 0.1 to 0.5 g/10 min; and
(iv) the polyethylene composition has an $SHI_{(2.7/210)}$ of 10 to 49.

It has been found that with such polyethylene compositions pipes can be produced which have an enhanced flexibility. Therefore, pipes made of the inventive polyethylene composition can more easily be straightened, aligned into the trenches and passed around corners. Nevertheless, such pipes have also high mechanical strength, which e.g. allows for the pipe being used for the transport of pressurized fluids, an excellent long-term stability and a good rapid crack propagation resistance. Furthermore, the polyethylene compositions also have good processability.

It should be noted that the composition of the present invention is characterised not by any single one of the above defined features, but by their combination. By this unique combination of features it is possible to obtain pipes of superior performance, particularly with regard to flexibility and rapid crack propagation (RCP), while minimum required strength (MRS), processability, impact strength and slow crack propagation resistance are maintained.

The term molecular weight where used herein denotes the weight average molecular weight $M_w$.

The term "base resin" denotes the entirety of polymeric components in the polyethylene composition according to the invention, usually making up at least 90 wt % of the total composition. Preferably, the base resin is consisting of fractions (A) and (B), optionally further comprising a prepolymer fraction in an amount of up to 20 wt %, preferably up to 10 wt %, more preferably up to 5 wt % of the total base resin.

In addition to the base resin, usual additives for utilization with polyolefins, such as pigments, stabilizers (antioxidant agents), antacids and/or anti-UVs, antistatic agents and utilization agents (such as processing aid agents) may be present in the polyethylene composition. Preferably, the amount of these additives is 10 wt % or below, further preferred 8 wt % or below, still more preferred 4 wt % or below of the total composition.

Preferably, the composition comprises carbon black in an amount of 8 wt % or below, further preferred of 1 to 4 wt %, of the total composition.

Further preferred, the amount of additives different from carbon black is 1.5 wt % or less, more preferably 1.0 wt % or less, most preferably 0.5 wt % or less.

Usually, a polyethylene composition such as that of the present invention, comprising at least two polyethylene fractions, which have been produced under different polymerisation conditions resulting in different weight average molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The polyethylene composition preferably has an $MFR_5$ of 0.15 to 0.5 g/10 min, more preferably of 0.2 to 0.4 g/10 min.

The base resin preferably has a density of 940 to 946 kg/m$^3$, more preferably 941 to 945 kg/m$^3$.

The SHI is the ratio of the viscosity of the polyethylene composition at different shear stresses. In the present invention, the shear stresses at 2.7 kPa and 210 kPa are used for calculating the $SHI_{(2.7/210)}$ which may serve as a measure of the broadness of the molecular weight distribution.

The SHI of the polyethylene compositions of the present invention is comparatively low. This is an indication of a rather narrow molecular weight distribution of the base resin. The SHI of the polyethylene compositions according to the invention is preferably 10 to 45, more preferably 15 to 35.

In a preferred embodiment the polyethylene composition further comprises a nucleating agent. The amount of such a nucleating agent in the polyethylene composition is preferably 0.01 to 0.5 wt %, further preferred 0.05 to 0.25 wt %.

The nucleating agent may be any compound or mixture of compounds capable of nucleating the crystallization, such as a pigment having a nucleating effect or an additive used only for nucleating purposes. Examples of the first category of compounds are phthalocyanine blue or green pigments (e.g. PB15:1, PB15:3, PG7), isoindolinone and isoindoline pigments (e.g. PY109, PY110, PO61), benzimidazolone pigments (e.g. PO62, PO72), quinacridone pigments (e.g. PY19), benzimidazolone pigments (e.g. PY180, PY181), quinophthalone pigments (e.g. PY138), chinacridone pigments (e.g. Pigment Violet PV19) and azoheterocyclus pigments (e.g. PO64).

The nucleating agent may also be a polymeric additive, such as a polymer of vinylcyclohexane or 3-methyl-1-butene. In such case, the polymeric additive, which preferably has a melting point above 200° C., may be blended into the bimodal polymer by conventional means in an extruder, or it may be prepolymerized on the catalyst as disclosed e.g. in WO 99/24478.

Fraction (A) preferably has a $MFR_2$ of 10 to 300 g/10 min, more preferably 20 to 200 g/10 min, still more preferably of 30 to 100 g/10 min, most preferably of 45 to 70 g/10 min.

Fraction (A) preferably has a density of 955 to 980 kg/m$^3$, more preferably 960 to 980 kg/m$^3$, and even more preferably 970 to 980 kg/m$^3$.

Furthermore, fraction (A) preferably is an ethylene homopolymer.

The shear stress $\eta_{2.7\,kPa}$ of the polyethylene composition is preferably 80 to 230 kPas, more preferably 100 to 210 kPas and still more preferably 130 to 200 kPas.

The flexural modulus of the polyethylene composition is preferably 500 to 900 MPa, more preferably 700 to 900 MPa.

The weight split in the base resin between fraction (A) and fraction (B) is preferably (30-47): (70-53), more preferably (35-45): (65-55).

Furthermore, the polyethylene composition has a good rapid crack propagation resistance. A pipe made of the multimodal polyethylene composition according to the present invention preferably has a ductile brittleness temperature ($T_{crit.}$) of −12° C. or lower, more preferably −15° C. or lower (RCP-S4 value).

Still further, the polyethylene composition has a slow crack propagation resistance of at least 500 h, more preferably of at least 1000 h, still more preferably of at least 2000 h, and most preferably of at least 4000 h at 5.5 MPa hoop stress and 9.2 bar internal pressure at 80° C.

A pressure pipe made of the multimodal polymer composition according to the present invention preferably has a design stress rating of at least MRS8.0, and more preferably of at least MRS10.0.

Preferably, the polyethylene compositions, without Carbon black or fillers, of the present invention fulfil the following relationship:

$$\frac{FM}{\ln\left(\frac{\eta_{747Pa}}{SHI_{2.7/210}} \times MFR_5\right)} \leq 950$$

wherein FM denotes the flexural modulus as described above.

The numerator of the above given formula defines the flexibility of the material. If the flexibility becomes too high, however, the material loses its ability to withstand pressure. The denominator defines the pressure resistance of the material. Therefore, the above given relationship shows how to find a polyethylene composition which fulfils both the demands of flexibility and pressure resistance.

The base resin of the polyethylene composition preferably comprises at least 0.2 mol %, more preferably at least 0.75 mol %, and still more preferably at least 0.95 mol % of at least one alpha-olefin comonomer. The amount of comonomer is preferably at most 3.0 mol %, more preferably at most 2.5 mol %, and still more preferably at most 2.0 mol %.

Fraction (B) of the polyethylene composition preferably comprises at least 0.3 mol %, more preferably at least 0.6 mol %, and still more preferably at least 0.8 mol % of at least one alpha-olefin comonomer. The amount of comonomer is preferably at most 6.0 mol %, more preferably at most 5.0 mol %, and still more preferably at most 4.0 mol %.

As an alpha-olefin comonomer, preferably an alpha-olefin having from 4 to 8 carbon atoms is used. Still more preferably an alpha-olefin selected from 1-butene, 1-hexene, 4-methyl-1-pentene and 1-octene is used.

Where herein features of fractions (A) and/or (B) of the composition of the present invention are given, these values are generally valid for the cases in which they can be directly measured on the respective fraction, e.g. when the fraction is separately produced or produced in the first stage of a multistage process.

However, the base resin may also be and preferably is produced in a multistage process wherein e.g. fractions (A) and (B) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

The polyethylene composition according the invention preferably is produced so that at least one of fractions (A) and (B), preferably (B), is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

Further, the polyethylene base resin preferably is produced in a multistage process. Polymer compositions produced in such a process are also designated as "in-situ"-blends.

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst.

Accordingly, it is preferred that fraction (A) and (B) of the polyethylene composition are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage.

Optionally and advantageously, the main polymerisation stages may be preceded by a prepolymerisation, in which case up to 20 wt %, preferably 1 to 10 wt %, more preferably 1 to 5 wt %, of the total base resin is produced. The prepolymer is preferably an ethylene homopolymer (HDPE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the reactors, the different molecular-weight-distribution curves of these polymers together forming a molecular-weight-distribution curve having a broad maximum or several maxima, i.e. the end product is a multimodal polymer mixture.

It is preferred that the multimodal base resin of the polyethylene composition according to the invention is a bimodal polyethylene mixture consisting of fractions (A) and (B), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 200 to 800 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

The composition of the invention preferably if produced in a process comprising a compounding step, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the composition during the compounding step in the amount as described above. Preferably, the composition of the invention obtained from the reactor is compounded in the extruder together with additives in a manner known in the art.

The extruder may be e.g. any conventionally used extruder.

Furthermore, the present invention relates to an article, preferably a pipe comprising a polyethylene composition as described above and to the use of such a polyethylene composition for the production of an article, preferably a pipe.

EXAMPLES

1. Definitions and Measurement Methods a) Density

Density is measured according to ISO 1183-2. Sample preparation is done in accordance with ISO 1872-2B.

b) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5.00 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.

c) Rheological Parameters

Rheological parameters such as Shear Thinning Index SHI and Viscosity are determined by using a rheometer, preferably a Physica MCR 300 Rheometer distributed by Anton Paar GmbH. The definition and measurement conditions are described in detail on page 8 line 29 to page 11, line 25 of WO 00/22040.

d) Rapid Crack Propagation

The rapid crack propagation (RCP) resistance of a pipe is determined according to a method called the S4 test (Small Scale Steady State), which has been developed at Imperial College, London, and which is described in ISO 13477:1997 (E).

According to the RCP-S4 test a pipe is tested, which has an axial length not below 7 pipe diameters. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure. The pipe and the equipment surrounding it are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.5 diameters, is measured for each test and is plotted against the set test temperature. If the crack length exceeds 4 diameters, the crack is assessed to propagate. If the pipe passes the test at a given temperature, the temperature is lowered successively until a temperature is reached, at which the pipe no longer passes the test, but the crack propagation exceeds 4 times the pipe diameter. The critical temperature ($T_{crit}$), i.e. the ductile brittle transition temperature as measured according to ISO 13477:1997 (E) is the lowest temperature at which the pipe passes the test. The lower the critical temperature the better, since it results in an extension of the applicability of the pipe.

e) Constant Tensile Load (CTL)

The slow crack propagation resistance is determined with this test. The CTL test is done with reference to ISO 6252:1992 (E), with the notch according to ASTM 1473, in the following way:

The CTL test is a test for accelerated slow crack growth where the acceleration is maintained by elevated temperature of 60° C. The testing is performed in a surface active solution and the incorporation of a notch both accelerates the time to failure and ensures a plain strain in the samples.

The stress in the samples was 5.0 MPa (actual stress in the notched region). The surfactant used in the test was IGEPAL CO-730 at a temperature of 60° C.

The samples are prepared by pressing a plaque with a total length of 125 to 130 mm and a width at its ends of 21±0.5 mm. The plaque then is milled into the correct dimensions in a fixture on two of the sides with a centre distance of both holders of 90 mm and a hole diameter of 10 mm. The central part of the plaque has a parallel length of 30±0.5 mm, a width of 9±0.5 mm, and a thickness of 6±0.5 mm.

A front notch of 2.5 mm depth is then cut into the sample with a razor blade fitted into a notching machine (PENT-NOTCHER, Norman Brown engineering), the notching speed is 0.2 mm/min. On the two remaining sides side grooves of 0.8 mm are cut which should be coplanar with the notch. After making the notches, the sample is conditioned in 23±1° C. and 50% relative humidity for at least 48 h. The samples are then mounted into a test chamber in which the active solution (10% water solution IGEPAL CO-730, chemical substance: 2-(4-Nonyl-phenoxy)ethanol, $C_{17}H_{28}O_2$) is kept. The samples are loaded with a dead weight and at the moment of breakage an automatic timer is shut off.

f) Pressure Testing and Design Stress

The design stress rating is the circumferential stress a pipe is designed to withstand for 50 years without failure and is determined for different temperatures in terms of the Minimum Required Strength (MRS) according to ISO/TR 9080. Thus, MRS 8.0 means that the pipe is a pipe withstanding a hoop stress of 8.0 MPa gauge for 50 years at 20° C., and similarly MRS10.0 means that the pipe withstands a hoop stress of 10 MPa gauge for 50 years at 20° C.

These values are calculated from the results of the pressure testing which are carried out according to ISO 1167. Pipes with a diameter of 32 mm are tested at different temperatures and inner pressure.

g) Creep Resistance

The short term creep ratio was measured in a four point bending mode according to DIN-Certco ZP 14.3.1 (former DIN 54852-Z4) at 1 min and 200 h.

h) Flexural Modulus

Flexural modulus was determined according to ISO 178. The test specimens were 80×10×4.0 mm (length×width×thickness). The length of the span between the supports was 64 mm, the test speed was 2 min/min and the loadcell was 100 N. The equipment used was an Alwetron TCT 25.

2. Polyethylene Compositions

Production of polyethylene composition base resins was performed in a multistage reaction comprising a prepolymerisation in slurry in a 50 dm³ loop reactor, followed by transferring the slurry to a 500 dm³ loop reactor wherein polymerisation was continued in slurry to produce the low molecular weight component, and a second polymerisation in a gas phase reactor in the presence of the product from the second loop reactor to produce the comonomer containing high molecular weight component. The comonomer was 1-butene in all compositions produced.

As a catalyst, Lynx 200 from Engelhard Corporation in Pasadena, USA, was used.

For the comparative examples, a Ziegler-Natta catalyst in accordance with Example 1 of EP 0 688 794 has been used.

The nucleating agent used in the Examples is Pigment Cromophtal blue 4GNP (phthalocyanine blue).

The polymerisation conditions applied are listed in Table 1.

Examples 1 and 2, showing compositions 1 and 2, respectively, are Examples according to the invention. Example 3 is a comparative Example which shows composition 3. This is a polyethylene composition according to the prior art. In all three Examples in the step of prepolymerization homopolymers are produced.

TABLE 1

| Example | | 1 | 2 | 3 (Comp.) |
|---|---|---|---|---|
| Prepolymerisation | | | | |
| Temperature | ° C. | 60 | 60 | 40 |
| Pressure | bar | 63 | 63 | 63 |
| MFR$_5$ | g/10 min | 3.5 | 3.5 | 0.5 |
| Slurry Polymerisation in Loop Reactor | | | | |
| Temperature | ° C. | 85 | 85 | 95 |
| Pressure | bar | 57 | 58 | 57 |
| C$_2$ concentration | mol % | 4.7 | 4.0 | 3.0 |
| H$_2$/C$_2$ | mol/kmol | 325 | 252 | 502 |
| C$_4$/C$_2$ | mol/kmol | 0 | 112 | 0 |
| MFR$_2$ | g/10 min | 60 | 60 | 300 |
| Density | kg/m³ | >970 | 959 | >970 |
| Gas Phase Polymerisation | | | | |
| Temperature | ° C. | 85 | 85 | 85 |
| Pressure | bar | 20 | 20 | 20 |
| C$_2$ concentration | mol % | 16 | 21 | 4.8 |
| H$_2$/C$_2$ | mol/kmol | 24 | 38 | 5.8 |
| C$_4$/C$_2$ | mol/kmol | 82 | 64 | 108 |

TABLE 1-continued

| Example | | 1 | 2 | 3 (Comp.) |
|---|---|---|---|---|
| JSW CIM90P Extruder | | | | |
| Feed | kg/h | 221 | 220 | |
| SEI | kWh/t | 304 | 306 | |
| Melt temperature | ° C. | 230 | 230 | |
| Properties of Base resin | | | | |
| Density | kg/m³ | 941 | 941 | 947 |
| Split (Prepol./loop/gas phase) | | 2:38:60 | 2:38:60 | 1.5:49.5:49 |
| Properties of Composition | | | | |
| MFR$_5$ | g/10 min | 0.24 | 0.27 | 0.29 |
| MFR$_{21}$ | g/10 min | 5.0 | 5.3 | 9.9 |
| Density | kg/m³ | 942.5 | 942.6 | 959 |
| Comonomer content | wt % | 1.7 | 1.2 | 1.1 |
| Flexural modulus | MPa | 769 | 743 | 1050* |
| T$_{crit.}$ (RCP-S4) | ° C. | −18 | −18 | −12 |
| Creep modulus (200 h) | MPa | 283 | 297 | |
| SHI$_{2.7/210}$ | | 23.1 | 22.3 | 98 |
| η$_{2.7\,kPa}$ | kPas | 168 | 191 | 260 |
| η$_{747\,Pa}$ | kPas | 225 | 289 | 580 |
| Pressure testing (80° C., 5.5 MPa) | h | >2352 | >2328 | >1000 |
| MRS | MPa | ≧10.0 | ≧10.0 | ≧10.0 |
| CTL | h | >1000 | >1400 | >1500 |
| Cromophtal blue 4GNP | wt % | 0.1 | 0.1 | 0 |
| Carbon black | wt % | 0 | 0 | 2.3 |

*without Carbon black

The invention claimed is:

1. A polyethylene composition comprising a base resin which comprises
   (a) an ethylene homo- or copolymer fraction (A); and
   (b) an ethylene homo- or copolymer fraction (B),
   wherein
   (i) fraction (A) has a lower average molecular weight than fraction (B);
   (ii) the base resin has a density of 940 to 947 kg/m³, determined according to ISO 1183-2;
   (iii) the polyethylene composition has an MFR$_5$ of 0.1 to 0.5 g/10 min, determined according to ISO 1133;
   (iv) the polyethylene composition has an SHI$_{(2.7/210)}$ of 10 to 45;
   (v) fraction (B) comprises 0.3 to 6.0 mol % of at least one alpha-olefin comonomer; and
   (vi) fraction (A) has a density of 955 to 980 kg/m³, determined according to ISO 1183-2.

2. The polyethylene composition according to claim 1 further comprising a nucleating agent.

3. The polyethylene composition according to claim 1, wherein fraction (A) has a MFR$_2$ of 10 to 300 g/10 min, determined according to ISO 1133.

4. The polyethylene composition according to claim 3, wherein fraction (A) has a MFR$_2$ of 30 to 100 g/10 min, determined according to ISO 1133.

5. The polyethylene composition according to claim 1, wherein the shear stress of the polyethylene composition η$_{2.7\,kPa}$ is 80 to 230 kPas.

6. The polyethylene composition according to claim 1, wherein the flexural modulus of the polyethylene composition is 500 to 900 MPa, determined according to ISO 178.

7. The polyethylene composition according to claim 1, wherein the weight split between fraction (A) and fraction (B) is (30-47):(70-53).

8. The polyethylene composition according to claim 1 wherein the rapid crack propagation resistance of a pipe made of the polyethylene composition as measured in the S4 test results in a $T_{crit}$ of <−12° C., determined according to ISO 13477:1997 (E).

9. The polyethylene composition according to claim 1 wherein the slow crack propagation resistance of a pipe made of the polyethylene composition as measured according to ISO 6252 (CTL) with a notch according to ASTM 1473 is at least 500 h.

10. The polyethylene composition according to claim 1 wherein the base resin comprises 0.2 to 3.0 mol % of at least one alpha-olefin comonomer.

11. An article comprising a polyethylene composition according to claim 1.

12. The article according to claim 11 wherein the article is a pipe.

13. The pipe according to claim 12 which fulfils the MRS 10.0 requirement according to ISO 9080.

14. The polyethylene composition of claim 1, wherein the base resin has a density of 940 to 946 kg/m³, determined according to ISO 1183-2.

15. The polyethylene composition of claim 1, wherein the base resin has a density of 941 to 945 kg/m³, determined according to ISO 1183-2.

16. The polyethylene composition of claim 1, wherein the polyethylene composition has an $SHI_{(2.7/210)}$ of 15 to 35.

17. The polyethylene composition of claim 1, wherein the polyethylene composition has an $SHI_{(2.7/210)}$ of 15 to 23.1.

18. A polyethylene composition comprising a bimodal base resin which comprises
 (a) an ethylene homo- or copolymer fraction (A) that has a $MFR_2$ of 10 to 300 g/10 min, determined according to ISO 1133; and
 (b) an ethylene homo- or copolymer fraction (B),
 wherein
 (ii) fraction (A) has a lower average molecular weight than fraction (B);
 (ii) the base resin has a density of 941 to 945 kg/m³, determined according to ISO 1183-2;
 (iii) the polyethylene composition has an $MFR_5$ of 0.2 to 0.4 g/10 min, determined according to ISO 1133;
 (iv) the polyethylene composition has an $SHI_{(2.7/210)}$ of 15 to 35;
 (v) the polyethylene composition further comprises a nucleating agent; and
 (vi) fraction (B) comprises 0.3 to 6.0 mol % of at least one alpha-olefin comonomer.

* * * * *

UNITED STATES PATENT AND TRADEMARK OFFICE
CERTIFICATE OF CORRECTION

PATENT NO.        : 8,367,763 B2                                  Page 1 of 1
APPLICATION NO.   : 12/440637
DATED             : February 5, 2013
INVENTOR(S)       : Bäckman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this

First Day of September, 2015

Michelle K. Lee
*Director of the United States Patent and Trademark Office*